July 29, 1947.  C. H. KEEPERS  2,424,619
DEVICE FOR AND METHOD OF MEASURING VOLUME OF WOOD IN STACKS
Filed March 4, 1943   4 Sheets-Sheet 1

Inventor
CECIL H. KEEPERS.
by

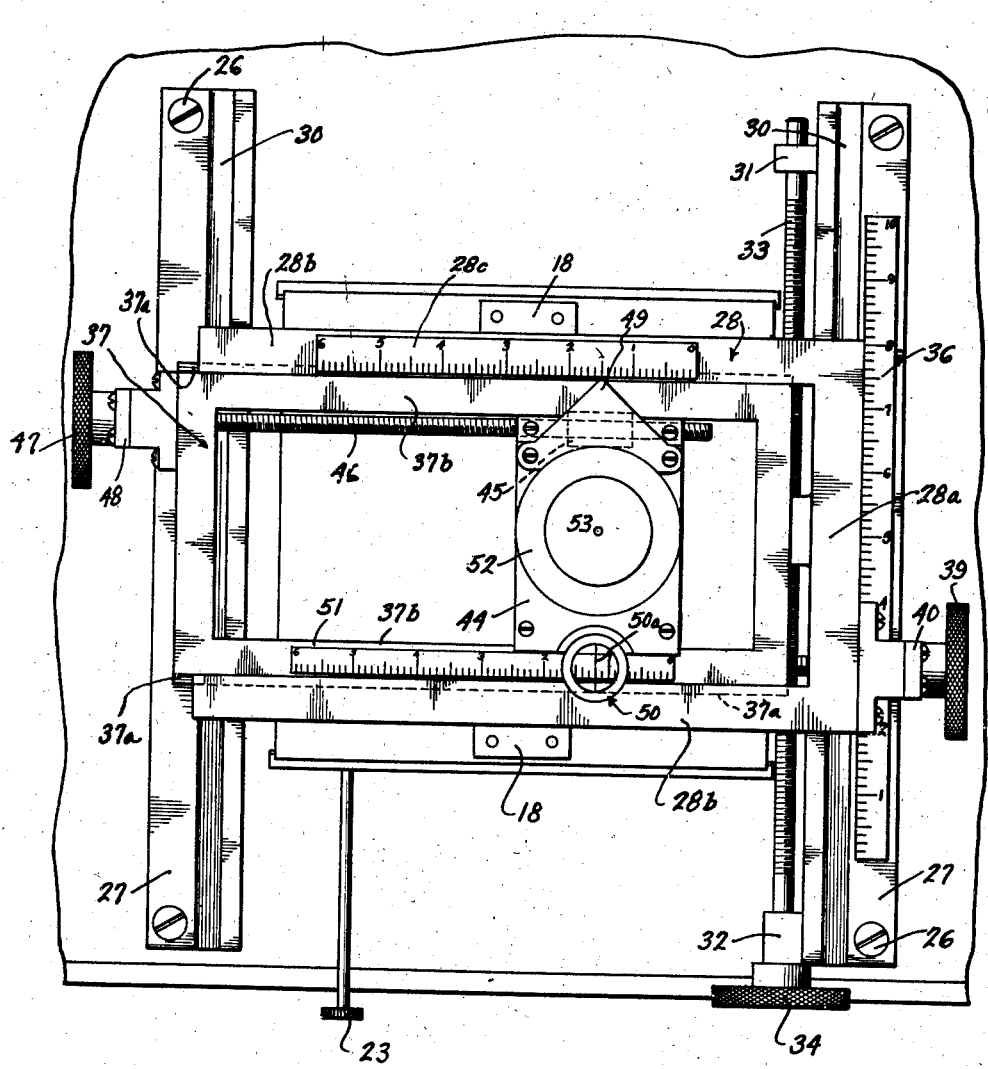

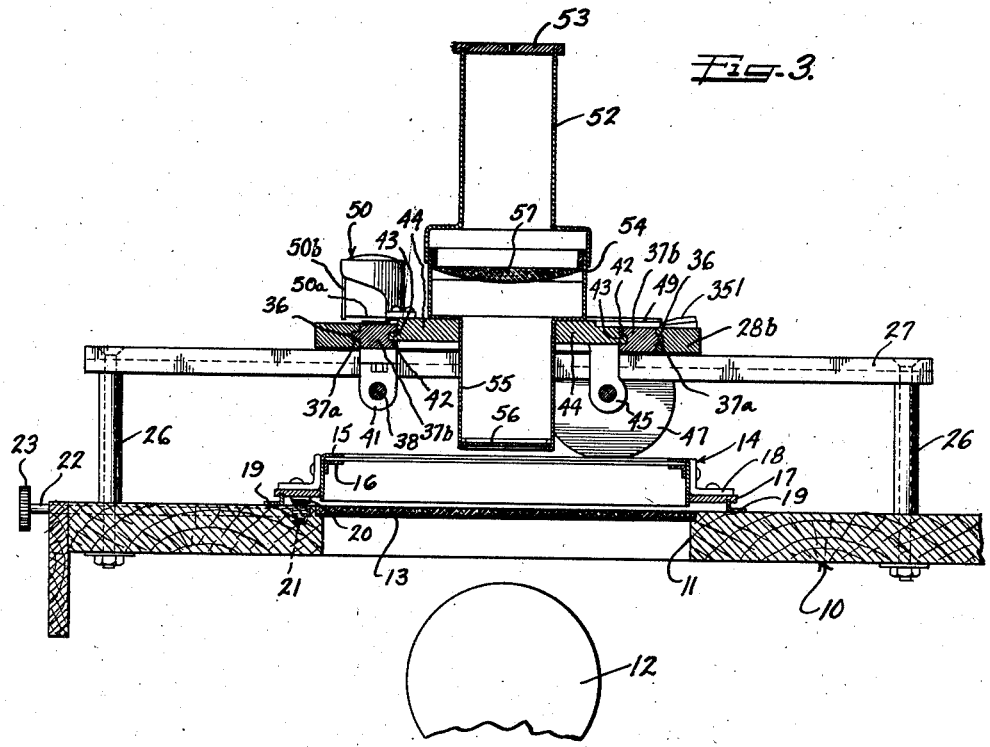
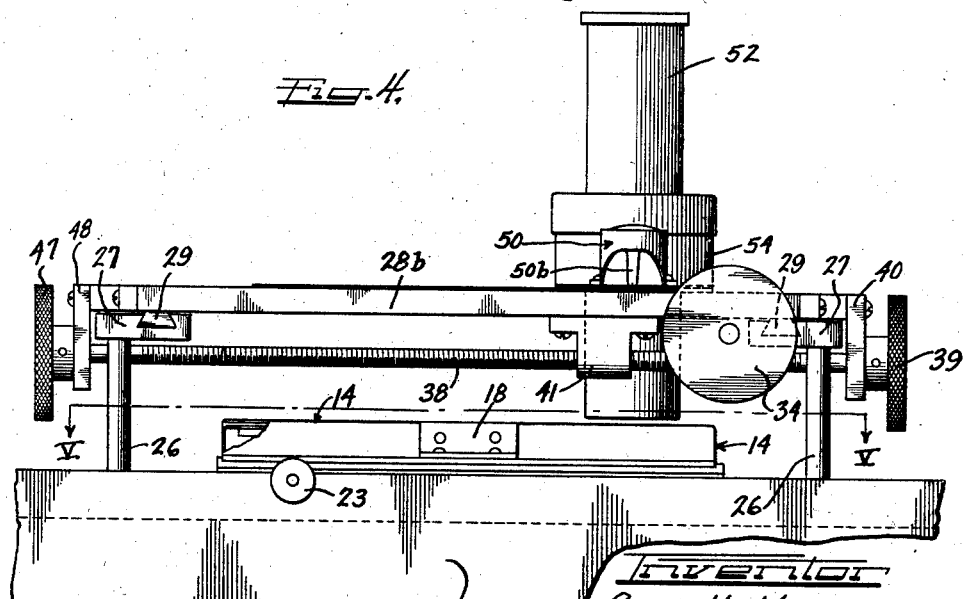

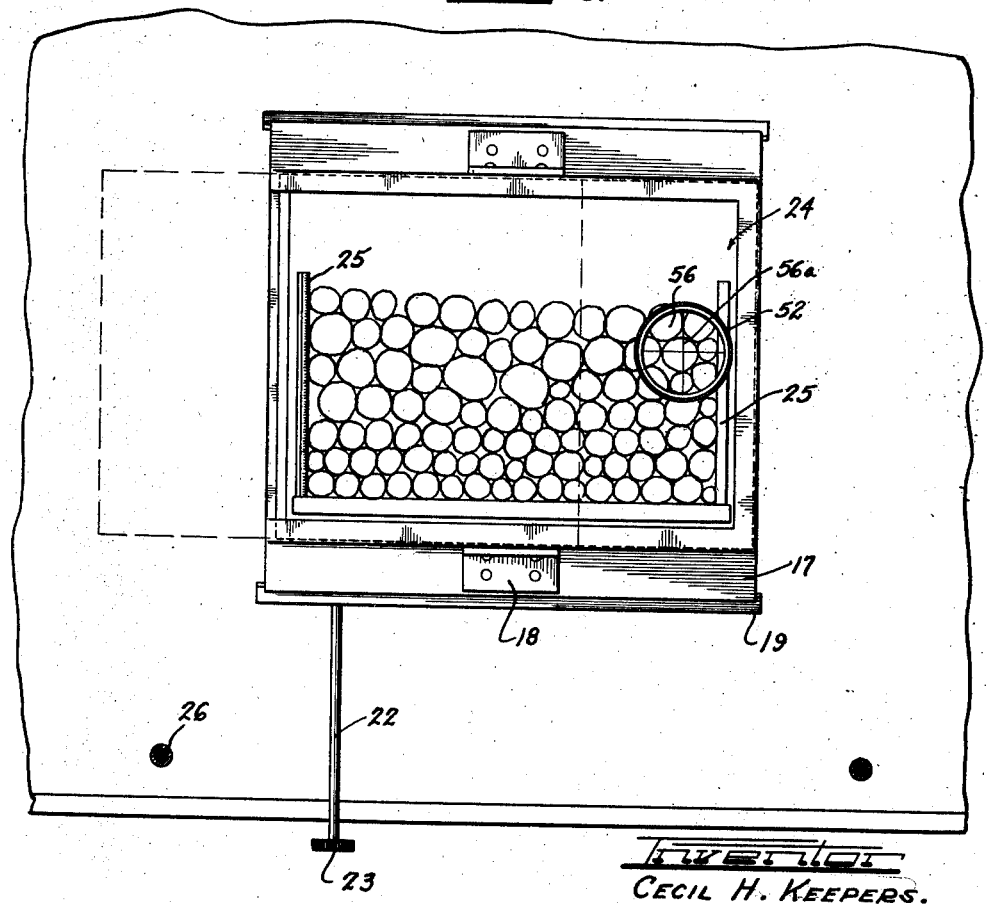

Patented July 29, 1947

2,424,619

UNITED STATES PATENT OFFICE 2,424,619

DEVICE FOR AND METHOD OF MEASURING VOLUME OF WOOD IN STACKS

Cecil H. Keepers, Nekoosa, Wis., assignor to Nekoosa-Edwards Paper Company, Port Edwards, Wis., a corporation of Wisconsin Application March 4, 1943, Serial No. 477,980

3 Claims. (Cl. 33—125)

This invention relates to a device for and to a method of accurately measuring the actual volume of wood in a stack, and is directed particularly to a device and method which obviates the handling of the wood that is usually required in order to make other than a scaler's estimate of the wood volume.

The evaluation of the volume of wood contained in a stack of wood is rendered difficult by the fact that the individual logs in that stack are of varying cross-sectional area at their ends and of varying taper throughout their lengths. Therefore, much of the space within the limits of a stack represents space unoccupied by wood. The determination of the actual volume of wood in a given stack has in the past been based either upon the estimation by an experienced scaler or upon measurements of a sample quantity of wood selected from the entire lot. Both of these methods are time-consuming and costly and, furthermore, at best merely give an approximation of the actual volume present.

An important object of the present invention is to provide a device and method for accurately measuring the volume of wood in a given stack, whereby the degree of accuracy of the measurement is greatly increased over the approximation normally obtained by the use of previously known methods.

It is another object of this invention to provide an apparatus and method whereby the measurement may be made without requiring additional handling of the wood and without delaying its movement to any considerable degree should it be in transit.

Still another object of the invention is to provide an apparatus and method for measuring the actual volume of wood in a stack whether it be located in piles during storage or on flat cars during transit.

Still another object of the invention is to provide an apparatus and method for measuring the actual volume of wood in a stack by the utilization of a photograph of the ends of the logs in said stack, thereby affording a permanent record of the shipment which is available for future reference.

Still another important object of the invention is to provide an apparatus and method for measuring the volume of wood in a given stack of logs, by the use of which measurements and calculations may be made rapidly and accurately by an operator who is unskilled in the art of scaling wood.

In accordance with the general features of my invention, there is provided herein an apparatus for accomplishing the purposes stated above which includes an objective for scanning a line extending across the face of a photograph depicting the cut ends of the logs in a regularly piled stack of wood. This objective is moved progressively over areas of the photograph which disclose wood and other areas which disclose air spaces, or voids between the logs. When the objective is being moved over the wood by means of one operating member, this movement is registered on two separate scales, and when the objective is being moved across air spaces between the logs by another operating mechanism, this latter movement is registered on only one of said scales. This latter scale thus gives a cumulative reading, while the other scale indicates only the reading over wood. The ratio of the wood reading on this scale to the cumulative reading is the ratio of actual wood to total linear distance traversed. This first scanning operation having been completed, the apparatus may then be similarly operated to scan other parallel and equidistant lines across the photograph. From the several readings obtained, a mean ratio of wood to total stack dimension shown in the photograph may be determined. Thereafter, the actual volume of wood in the stack may be quickly determined from the known overall dimensions of the stack.

A more specific object of my invention is to provide means to enable an unskilled operator to quickly scan lines across the photograph and, as a result of such scanning operation, obtain simultaneously a wood reading and a cumulative reading, from which a ratio can readily be obtained for use in computing the actual volume of wood in a stack of known dimension.

Other objects of my invention will become apparent from the following description and accompanying drawings in which:

Figure 2 is a view similar to Figure 1 but showing a reading obtained as the result of a partial scanning operation, the photograph to be scanned being omitted to avoid confusion;

Figure 3 is a view taken on the line III—III of Figure 1;

Figure 4 is a fragmentary side elevation of my device, parts thereof being shown in cross section;

Figure 5 is a cross section taken on the line

Figure 1:
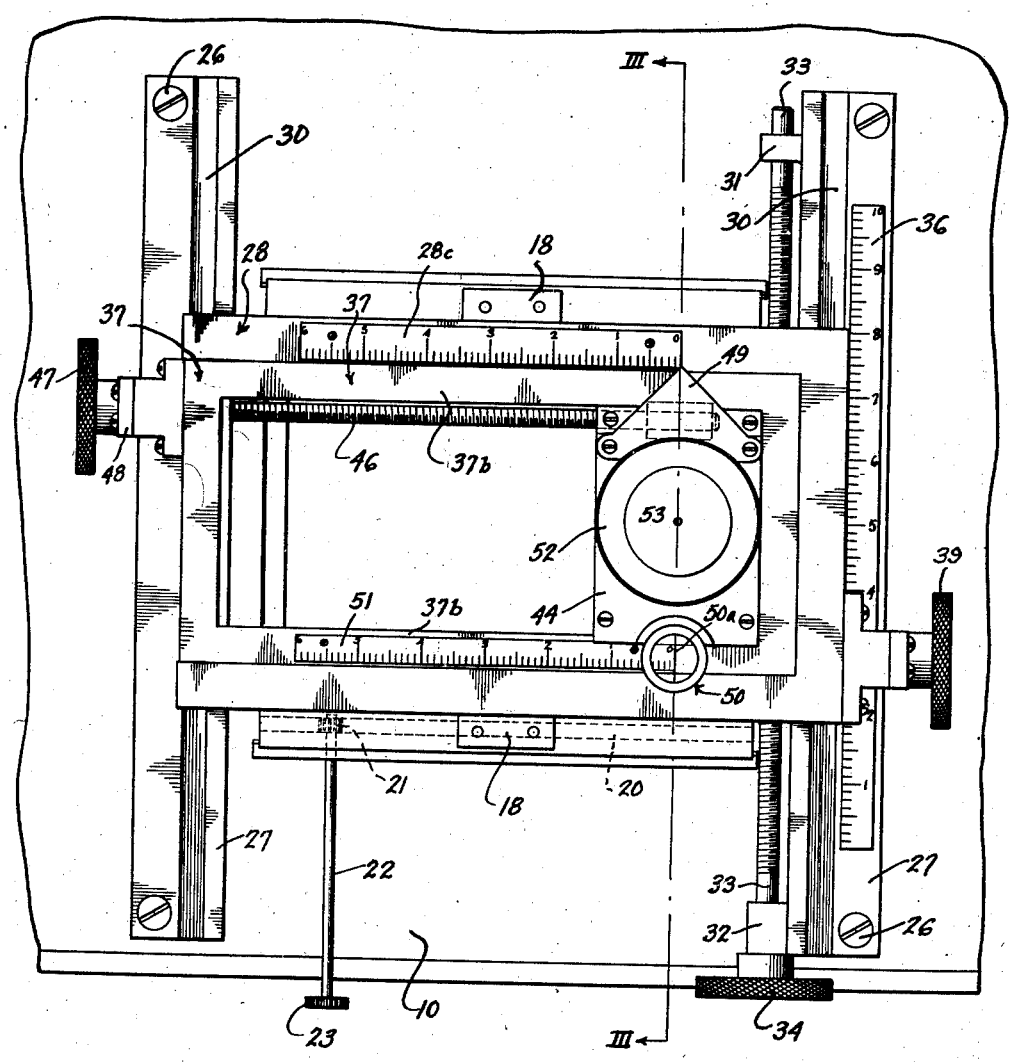
Figure 1 represents a top plan view of a device embodying my invention by which my method may be practiced, the operating parts being shown at zero registry.

V—V of Figure 4, illustrating the photograph in position, and, in dotted lines, the operation of adjusting the position of the photograph; and Figure 6 is a view of the photograph such as is used in carrying out my invention.

It is to be understood that the embodiment shown herein is for illustrative purposes only and the invention should not be limited thereto otherwise than necessitated by the scope of the appended claims.

As best shown in Figures 3, 4 and 5, the apparatus embodying my invention may be mounted upon a suitable table or stand 10, which is provided with a substantially central opening 11 having a source of light 12 therebeneath. A piece of translucent glass is suitably mounted across the aperture 11 and above this glass and aligned therewith is a photograph retainer 14.

The retainer 14 may be of any suitable construction but preferably includes photograph retaining members 15 and 16 between which the edges of the photograph may be secured. The outer member 15 is secured to supporting elements 17 by means of brackets 18, the elements 17 being grooved on their lower surface to receive an upstanding portion of tracks 19. In order that the supporting elements 17 together with their appended parts and the photograph, may be adjusted laterally as indicated by the dotted lines in Figure 5, the lower surface of one of the elements 17 is provided with a rack 20, which may be engaged by a pinion 21 mounted on the end of a rod 22 which extends outwardly of the edge of the table or stand 10. The rod 22 is provided with a knurled handle 23 for ease of manual rotation thereof. From the foregoing it will be seen that rotation of the handle 23 will cause a lateral shifting of the member 14, whereby the photograph 24 (see Fig. 6) may be brought into the desired position.

As has been indicated previously, the invention is directed to an accurate method for the determination of the volume of wood in a stack of logs disposed in superimposed relation. A view of the side of a stack showing the cut ends of the logs indicates generally the density of distribution of the logs in the stack. However, upon mere inspection such a view gives only an approximation of the relative volume of wood in the stack.

In carrying out my invention, I contemplate an actual linear measurement of the wood exposed at the side of the stack and a cumulative measurement of the wood plus the air spaces, or voids between the wood. These measurements are preferably although not necessarily made from a photograph of the stack.

From these measurements, the mean ratio of wood to total linear dimension of the stack may be calculated and thus the actual volume of the wood therein may be readily determined, if the length, width and height of the stack are known. The desired information may in this way be obtained without necessitating the handling of the logs. This is of particular importance when delays and demurrage are taken into consideration.

In calculating the quantity of wood in a given stack, the width of the stack is usually a relatively constant figure since the logs are usually cut to a constant length. When the logs are placed upon a flat car, the length of the stack is also a relatively constant figure due to the standard length of such a vehicle. The variable in the overall dimensions of a stack of logs is ordinarily the height thereof and in order that this variable may be permanently recorded upon the photograph to be later used for determining the quantity of wood in the stack, a scale 25 (Fig. 6) is arranged against the stack before the photograph is taken, so that it will appear in the photograph and indicate to the operator the height of the stack when the quantative determination is made.

An apparatus which may be used to carry out my invention is mounted upon standards 26 which are secured to the table 10 in any suitable manner. These standards support ways 27 which are disposed in parallel relationship to one another on each side of the photograph supporting assembly 14.

A primary frame or supporting member 28 is slidably secured to the ways 27 in bridging relationship by means of gibs 29 which engage in gibways 30 on the upper surfaces of the ways.

To the end that the primary frame 28 may be adjustably moved through a path parallel to the ways 27, one of the ways is provided with inwardly extending bosses 31 and 32 which are apertured to rotatably receive a worm 33 having an operating knob 34 at one end thereof.

As will be seen from Figure 2, the primary frame 28 is provided with an internally extending boss 35 which is apertured and internally threaded to receive a threaded rod 33. Thus, rotation of the operating knob 34 causes the primary frame 28 and its appurtenances (to be described presently) to be moved in one direction relative to a photograph such as shown in Figure 5. To the end that the extent of such movement of the primary frame 28 may be measured, there is provided on the upper surface of one of the ways a scale 36, the reference member for which may be either the upper or lower edge of the primary frame 28 as viewed in Figure 2.

As will be seen from Figures 1 and 2, the primary frame 28 is provided with an end member 28a and transverse members 28b, the upper member 28b having a scale 28c fixedly secured thereto. The end of the primary frame opposite the member 28a is open and the members 28b thereof are grooved on their inner surfaces as shown clearly in Figure 3, at 36.

A secondary frame 37 is arranged within the primary frame 28 to slide laterally therein, and is provided with tongues 37a which are slidably received by said grooves 36. From Figure 2 it will be seen that the secondary frame 37 is adapted to slide laterally relative to the primary frame 28 by virtue of its movement into and out of the open end of the primary frame.

This movement of the secondary frame 37 is accomplished by means of a threaded rod 38 having an operating handle 39. The rod 38 is rotatably mounted in a hanger member 40 which is suitably secured to the outer surface of the member 28a of the primary frame by screws or the like. A lug 41 is secured in depending relationship from the lower surface of one of the bridging members 37b of the secondary frame 37, this lug 41 being apertured and internally threaded to receive the rod 38. Thus it will be seen that rotation of the operating knob 39 will cause a shifting movement of the secondary frame 37 and its appurtenances laterally of the mechanism and relative to the primary frame 28.

As will be seen from Figure 3, the inwardly disposed surfaces of the members 37b of the secondary frame 37 are provided with grooves 42. These grooves are adapted to receive tongues 43 which are formed integrally on an objective base 44. The objective base is further provided with a depending lug 45 which is apertured and internally threaded to receive a threaded rod 46 having an operating knob 47. The rod 46 is rotatably mounted through a hanger member 48 similar to that shown at 40. Thus it will be seen that rotation of the knob 47 will cause shifting movements of the objective base 44 relative to the primary frame 28 and the scale thereon as well as relative to the secondary frame 37.

The objective base 44 is further provided with an indexing member 49 which registers with the scale 28c on the primary frame 28 and a lens index assembly 50 which registers with a scale 51 mounted on the secondary frame 37.

As best shown in Figure 3, the objective through which the photograph may be viewed includes an eye piece casing 52 having a peep hole cover 53. The casing 52 is enlarged at the bottom and is attached to a lens-holding casing 54 which retains lens 57 and which includes a reduced lower portion 55 at the bottom of which a hair line glass 56 is mounted. The lower portion 55 is suitably secured through the objective base 44.

In carrying out my invention, a photograph such as that shown in Figure 6, is taken of the side of a stack which presents the ends of the logs. The scale 25 appears in the photograph. Thereafter the photograph is mounted in the assembly 14 as shown in Figure 5.

The secondary frame 37 and the objective base 44 are then regulated by knobs 39 and 47 and the respective worms until they assume a position at the right of the apparatus as shown in Figure 1. When in this position, the indexing member 49 registers with the zero mark on the scale 28c on the primary frame 28, while the index wire 50a held by the member 50b of the magnifying assembly 50 registers with the zero mark on the scale 51 secured to the secondary frame 37. Thereafter, in order that the intersection of the hair lines 56a in the hair line glass 56 may be disposed at the extreme right hand edge of the photograph, the knob 23 may be rotated to regulate the position of the photograph until this registry is obtained. The operator then operates the knob 34 in order to bring the intersection of the hair lines into registry with a selected horizontal line across the photograph.

The apparatus is then in adjustment for the first scanning operation which is accomplished by the alternate manipulation of the knobs 39 and 47 to progress the objective entirely across the photograph.

It will be seen that operation of the knob 39 will cause movement to the left (as viewed in Figs. 1 and 2) of both the secondary frame 37 and the objective, these parts moving relative to the primary frame 28. Thus, the indexing member 49 will register the length of such travel on the scale 28c, while the index wire 50a will remain stationary on the scale 51 because the objective mounting 44 is being carried with the secondary frame 37 and is not being moved relative thereto.

When, however, the intersection of the crosshairs is traversing a wood area, the operator ceases to operate the knob 39 and commences to operate the knob 47. During operation of the knob 47, the objective mounting 44 together with its appurtenances, will be moved relative to the primary frame 28 and the secondary frame 37. Consequently, the indexing member 49 continues to register the length of travel of the objective, while at the same time this movement is also registered independently by the index wire 50a on the scale 51.

It will be seen that as this alternate procedure is continued, the scale 28c is registering the cumulative distance traveled by the objective whether knob 39 or 47 is being operated. Thus, the scale 28c will ultimately show the total length of travel of the objective when the latter has traversed the entire photograph and the scale 51 will show only the distance traversed by the intersection of the hair lines over the area depicting wood. The ratio of wood to total length of line traversed is then readily determined by computing the ratio of the reading on the scale 51 to that on the scale 28c.

After this operation has been completed for one line, the objective is again moved to zero registry, as shown in Figure 1, and the knob 34 is operated to progress the primary frame 28a along a path disposed at right angles to the scanning path and along the scale 36 to select another horizontal line to be scanned.

This having been done, the operator again scans the photograph with the objective by alternate operation of the knobs 39 and 47 to obtain another total reading on the scale 28c and a reading of the distance traveled over wood alone on the scale 51. The operator again determines the wood ratio on that horizontal line. After scanning along a number, say five or more, equi-spaced horizontal lines, a mean ratio of wood to total length of the stack is obtained.

This mean ratio having been determined, the operator then merely computes the apparent volume of the stack from the known length and width, and the height thereof, checking the latter on the scale 25 in the photograph, and, computes the actual volume of solid wood in the entire stack by multiplying the apparent volume by the mean ratio.

The apparatus as shown in Figure 2 is in a position representing a partial scanning of a photograph therebeneath. It will be seen that a figure of 1.5 has been registered on the scale 28c. This figure represents the cumulative total of the distance scanned, since the indicator 49 traverses the scale upon movement of the secondary frame 37 during operation of knob 39 as well as upon movement of the objective mounting 44 relative to the scale 28c effected by manipulation of the knob 47. A simultaneous reading of the scale 51 shows 1.2. This lower figure is accounted for by the fact that the objective mounting 44 and the index wire 50a thereon move relative to the secondary frame 37 and to the scale 51 thereon only upon manipulation of the knob 47 for those distances through which the intersection of the hair lines 56a overlie wood. The ratio of 1.2 to 1.5, or 0.8 is the ratio of wood to total distance scanned. Multiplying the calculated apparent volume of the stack by 0.8, if that were the mean ratio obtained, would give the actual volume of wood in the stack.

For instance, if the knob 39 were manipulated when the crosshairs are passing over wood, and the knob 47 manipulated when the crosshairs are passing over air spaces, or voids, between the wood, then the reading on the scale 51 would represent the total of air space measurements and the reading on the scale 28c would represent the total length of the stack. The ratio of these two readings would then be the ratio of air to total stack volume, and, when multiplied by 100, would give the percentage of air in the stack. The difference between 100 and such percentage would thus represent the per cent of wood in the stack.

From the foregoing it will be seen that I have provided a method and apparatus by which the volume of wood in a given stack may be obtained without handling the wood and without materially delaying movement of the logs if they are in transit. Furthermore, I have provided a method and apparatus by which a permanent record of the shipment is made since the photographs may be filed away after being properly identified.

It will be understood that many changes may be made in the construction of my device without departing from the principles of my invention. For instance, the screw adjusting mechanisms could be just reversed from the arrangement illustrated herein. It is therefore not my purpose to limit the patent granted hereon otherwise than as necessitated by the scope of the appended claims.

What I claim is:

1. The method of ascertaining the volume of wood in a stack of logs, which includes the steps of photographing the ends of the logs disposed in the stack, selecting a plurality of parallel lines across the photograph, scanning the lines from end to end to measure the portion of the length thereof which intercepts one only of the two media wood and air, and the total length thereof which includes both wood and the air spaces between the wood to obtain values from which may be determined the mean ratio of wood to total stack dimension.

2. The method of ascertaining the volume of wood in a stack of logs, which includes photographing a side of the stack presenting ends of the logs, scanning the photograph along parallel lines thereon with reference to a pair of scales, for each line totalling the lengths of the portions which extend across wood on both of said scales and totalling the lengths of portions which extend across air and wood on only one of said scales, the mean ratio of the totals so obtained on the respective scales being the ratio of wood to total stack volume from which the actual wood volume may be calculated.

3. In an apparatus for use in measuring the volume of wood in a stack of logs from a photograph of a side of the stack depicting ends of the logs in the stack, means for mounting the photograph, a pair of ways disposed with the mounting means therebetween, a cross member bridging said ways and constructed and arranged to slide along a path parallel thereto, operating means connected with said cross member for moving the same through said path, an objective support mounted on said cross member for sliding movement relative thereto through a path substantially normal to the path of movement of said cross member and across said photograph, guide means for establishing said last named path, independent operating means connected with said objective support and said cross member for moving said objective support relative to the cross member, a scale on said cross member for indicating said movement, an objective mounted on said support for sliding movement relative thereto through a path parallel with said movement of the support, guide means for establishing said last named path, independent operating means connected with said objective and said support for moving said objective relative to said cross member and said support and a scale on said support for indicating said movement.

CECIL H. KEEPERS.

REFERENCES CITED

The following references are of record in the file of this patent:

UNITED STATES PATENTS

| Number | Name | Date |
| --- | --- | --- |
| 2,301,935 | Ehringhaus | Nov. 17, 1942 |
| 865,418 | Moe | Sept. 10, 1907 |
| 2,006,774 | Ohlsson | July 2, 1935 |
| 1,937,433 | Moe | Nov. 28, 1933 |
| 1,761,863 | Bassist | June 3, 1930 |
| 902,584 | Hulbner | Nov. 3, 1908 |

FOREIGN PATENTS

| Number | Country | Date |
| --- | --- | --- |
| 272,146 | Great Britain | June 9, 1927 |
| 215,914 | Germany | Nov. 1, 1909 |